Oct. 9, 1928.  
G. A. SCHETTLER  
1,686,768  
MACHINE FOR TREATING HIDES, SKINS, LEATHER,  
AND OTHER LIKE PIECES OF MATERIAL  
Filed Sept. 8, 1926
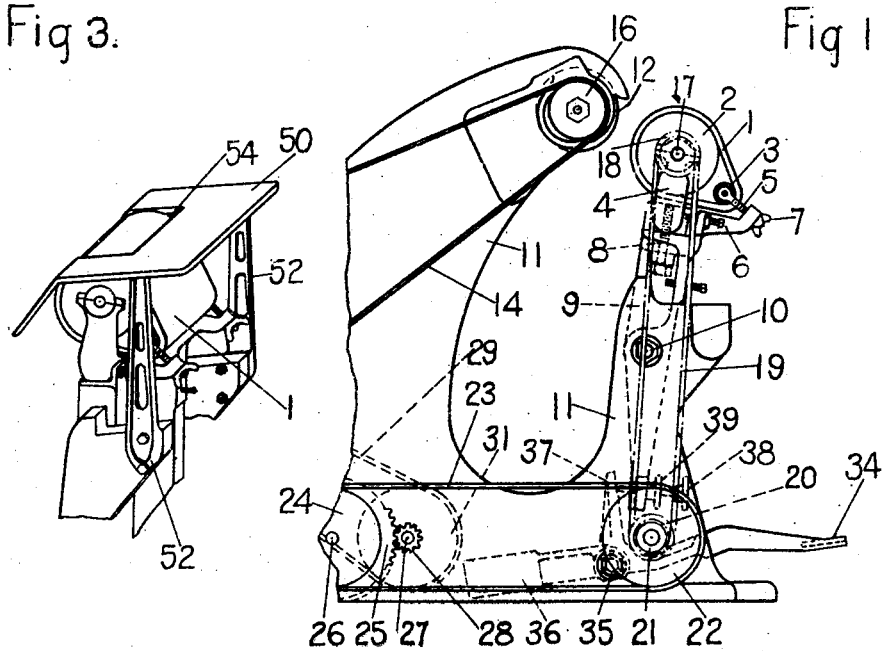
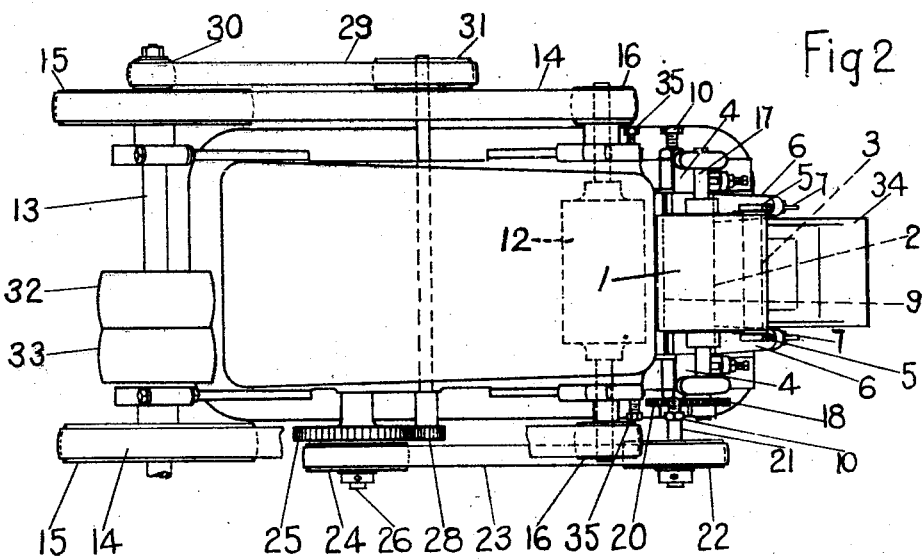
INVENTOR  
Gustav A. Schettler  
By his Attorney  
Nelson W. Howard Patented Oct. 9, 1928.

1,686,768

UNITED STATES PATENT OFFICE.

GUSTAV A. SCHETTLER, OF LEEDS, ENGLAND, ASSIGNOR TO THE TURNER TANNING MACHINERY COMPANY, OF PORTLAND, MAINE, A CORPORATION OF MAINE.

MACHINE FOR TREATING HIDES, SKINS, LEATHER, AND OTHER LIKE PIECES OF MATERIAL.

Application filed September 8, 1926, Serial No. 134,190, and in Great Britain September 29, 1925.

This invention relates to machines for treating hides, skins, leather, and other like pieces of material, and is illustrated as embodied in a buffing machine especially adapted for buffing operations upon relatively large and heavy pieces of leather. It is to be understood, however, that various features of the invention are not limited in their application to machines of the class illustrated but may have other applications and uses.

Objects of the invention are to facilitate the feeding of leather pieces to a work treating tool, to minimize the labor of the operator in his efforts to secure uniform treatment by the treating tool, and to provide a machine of the type referred to which will be more efficient in the production of work of the highest quality.

To these ends, and in accordance with important features of the invention, there is provided an improved work supporting means for presenting pieces of work successively to a work treating tool, such means comprising a work supporting table having a slot therein in which a member moves bodily between work receiving and work presenting positions for supporting portions of the work and presenting them to the work treating tool. As illustrated, the bodily movable member comprises an endless work presenting band arranged to be positively driven at a uniform speed to advance all portions of the work at the same rate past the treating tool while in contact therewith. By reason of the relative movement between the work presenting band and the work supporting table, there is a distinct tendency to stretch the piece of work due to the frictional drag on successive portions of the work as the driven band moves along the slot in the table directly toward the work treating tool. The result is that the work is disposed in extended conditions with all wrinkles or folds effaced so that all portions of the surface of the work are equally exposed to the tool.

In order that the illustrated endless work presenting band may press the work with a substantially uniform yielding pressure against the work treating tool, it is backed by a member having a soft yielding surface, the result being that the machine accommodates itself to work pieces of various grades of thickness and to work pieces which vary in the thickness of different portions of each piece. As exemplified in the illustrated construction, the yieldingly surfaced member for backing the band is constructed of felt disks compacted side by side into a roller which presents a broad supporting surface for the endless band.

These and other features of the invention will be described in detail and pointed out in the appended claims.

In the drawing:—

Figure 1 is a side elevation partly broken away illustrating one embodiment of the invention;

Fig. 2 is a plan of the machine shown in Fig. 1, a work-supporting table being omitted the better to show the parts beneath; and Fig. 3 is a view in perspective of the work supporting and presenting means.

In the machine illustrated, a positively driven work supporting element comprising an endless band 1 of the desired length and material passes round a carrier roller 2 and round a smaller roller 3. The carrier roller 2 is rotatably mounted in a saddle or frame 4 and the smaller roller is carried by eyebolts 5 which are passed through arms 6 attached to the saddle or frame, said eyebolts being adjusted to tension the band by wing nuts 7 or equivalent means. By means of a bolt or screw 8 the saddle or yoke 4 is fixed upon a frame 9 adapted to rock on a fulcrum formed by screws 10 in the main frame 11 of the machine to carry the work supporting band 1, and with it the work, towards and from a buffing roller or element 12. This latter is rotatably mounted in the main frame and driven from a main shaft 13 by means of belts 14 and pulleys 15 and 16. Fast on shaft 17 of the carrier roller 2 is a sprocket wheel 18 driven by a chain 19 from a sprocket wheel 20 fast on a shaft 21 rotatably mounted in the main frame below the fulcrum screws 10 of the frame 9. The shaft 21 is so mounted in relation to the said fulcrum that the rocking movement of the frame 9 has substantially no effect on the operation of the driving parts 18, 19 and 20. On the same shaft 21 is a pulley 22 driven by a belt 23 from a reduction gear mechanism comprising a pulley 24 and gear 25 on a shaft 26 suitably carried in the main frame, and driven from a transverse shaft 27, also mounted in the machine frame, by a pinion 28 which meshes with the gear 25. The transverse shaft 27 is driven by a belt 29 and pulleys 30 and 31 from the main shaft 13. By means of the two belt drives and associated gearing the speed of the work supporting band 1 is reduced to a convenient one for feeding the work.

A clutch (not shown) is provided to enable the driving pulley 22 to be put into and out of operative connection with the shaft 21 in order to leave the band 1 stationary or to drive the same at the will of the operator. The main shaft is equipped with fast and loose pulleys 32 and 33 which may be driven from any suitable source of power.

A treadle 34 is mounted on a fulcrum 35 in the machine frame and provided with a counterweight 36 and with an extension 37 for engagement with an adjusting screw 38 threaded through the lower end of the frame 9 and fitted with a lock nut 39. When the treadle is depressed the work supporting element comprising the band 1 is moved from the non-working position shown in Fig. 1 to working position with the work pressed against the buffing roll 12. Upon release of the treadle the frame moves outwards under the weight of the parts supported thereby, thus moving the band 1 to work receiving position.

The work-supporting band 1 is of felt and the carrier roller 2 is made of resilient felt discs compacted together side by side, this combination of band and discs being particularly suitable for such operations as buffing. The materials of which the band and carrier roller are made may however be varied. By using an endless band of felt over a roller of felt discs in the manner herein described, the latter are protected against wear and the full diameter and resiliency are maintained, in addition to which renewal costs are reduced since it is much less expensive to renew the endless band than it is to renew the resilient felt discs of the roller.

In the illustrated machine a table 50 is provided for the purpose of supporting large pieces of leather or other work while portions thereof are undergoing buffing operations. Preferably, and as shown, the table 50 is stationary, being supported by posts 52 rigidly secured to the frame 11 of the machine. In order that the work supporting band 1 may operate as above described, the table 50 is provided with a slot 54 of a size to accommodate the upper run of the endless band and in addition to permit bodily movement of the band along and through the slot in moving between work receiving and work presenting positions. When a piece of work supported on the table 50 is in position preparatory to a buffing operation, it extends over the surface of the table to substantial distances on each side of the slot therein, with portions of the work hanging down between the operator and the table. The work supporting band initially in retracted work receiving position, moves toward the buffing roll 12 upon starting the machine. In this movement, through frictional contact with the work, the bodily moving and travelling band 1 operates to put successive portions of the piece of work under tension sufficient to cause these portions, in position for immediate operation, to be in extended condition with any folds or wrinkles effaced so that the buffing roll reaches all portions of the surface of the work in a uniform manner.

In operating the illustrated machine, a piece of work, such as a calf skin or a side of leather, is placed upon the table 50 while the work presenting band 1, and the parts associated therewith, are in retracted work-receiving position, as indicated in Fig. 1. It is to be understood that when the machine is ready for operation, both the buffing roll 12 and the work presenting band 1 are being positively driven through the power means provided for that purpose, the band 1 being driven from the main shaft through connections comprising the chain 19. Hence, when the operator steps upon the treadle 34, thus causing the yoke 4 to turn about its pivot screws 10, the power driven band 1 moves directly toward the buffing roll 12 carrying a portion of the work into contact with the buffing roll. Since the buffing roll 12 and the band 1 are moving in directions to cause feeding of the work in a direction downwardly and inwardly while the buffing of the surface of the leather takes place, it follows that the band 1 must be permitted to return to or toward initial work-receiving position in order to permit the work to be shifted laterally to bring an untreated portion thereof into the path of the rotating buffing roll. Each time that the travelling band 1 is moved bodily toward the buffing roll 12, it places portions of the work to be operated upon under tension, thus conditioning it in a manner favorable to uniform operation by the buffing roll. It will be noted, furthermore, that, because of the feeding movement of the band 1 which is driven at a uniform rate of speed, the work will have all of its portions presented at the same rate to the buffing roll, and this, again, is a feature in securing uniformity of operation by the buffing roll. This feeding of the work by the band 1 serves to relieve the operator of the laborious efforts heretofore necessary in manipulating the work and in controlling the feed thereof to secure uniform results in buffing operations.

Having described my invention, what I claim as new and desire to secure by Letters Patent of the United States is:—

1. In a machine for treating leather and other like pieces of work, a rotary tool, means for presenting the work to the tool comprising an endless band, a member for backing the band along the line of thrust of the tool on the work, means comprising driving means for said member arranged positively to drive the band for feeding the work at a uniform rate past the tool, and means for causing relative bodily movement between the tool and the endless band to permit the work to be introduced therebetween.

2. In a machine for treating hides, skins and other like pieces of work, a rotary tool, means for presenting the work to the tool comprising an endless band, a member for backing the band along the line of thrust of the tool on the work, means for operating said member positively to drive the band for feeding the work past the tool, and means for causing bodily movement of the endless band away from the tool to permit the work to be introduced therebetween.

3. In a machine for treating hides and skins and other like pieces of work, a work-treating tool, a work support for presenting the work to the tool comprising an endless band for supporting the work, and rollers for supporting the band and keeping it under tension, one of said rollers being operative also to back the band along the line of the thrust of the tool against the work, said last-mentioned roller having a readily yieldable surface for yieldingly supporting the band.

4. In a machine for treating leather and other like pieces of work, a rotary work-treating tool, a work support for presenting the work to the tool comprising an endless felt band, and a roller operative to back the band along the line of the thrust of the tool against the work, said roller being composed of disks of felt compacted side by side to provide a yieldable surface for yieldingly supporting the band.

5. In a machine for treating hides and skins and other like pieces of work, a work-treating tool, a work support for presenting the work to the tool comprising an endless band, and rollers for supporting the band and keeping it under tension, one of said rollers being operative also to back the band along the line of the thrust of the tool against the work, said last-mentioned roller being composed of disks of felt compacted side by side and providing a yielding surface to back the band.

6. In a machine for treating leather and other like pieces of work, a rotary work-treating tool, a work support for presenting the work to the tool comprising a travelling band and a plurality of rollers for supporting the band and keeping it under tension, one of said rollers being operative also to back the band along the line of the thrust of the tool against the work, said last-mentioned roller being composed of disks of felt compacted side by side and providing a yielding surface to back the band along the line of thrust of the tool.

7. In a buffing machine, a buffing roll, a work-supporting means for presenting the work to the buffing roll comprising an endless band upon which the work is supported, rollers for supporting the band and for keeping it under proper tension, one of said rollers serving to back the band along the line of thrust of the buffing roll on the work, and means for driving the backing roller to cause the band to feed the work at a uniform rate past the buffing roll.

8. In a buffing machine, a buffing roll, a work-supporting means for presenting the work to the buffing roll comprising an endless band upon which a piece of work is supported, rollers for supporting the band and for keeping it under proper tension, means for driving one of the rollers to cause travel of the band at a predetermined rate to feed the work past the buffing roll, the driven roller serving also to back the band along the line of pressure of the buffing roll, and means for causing relative bodily movement between the buffing roll and the endless band to permit the work to be introduced therebetween.

9. In a buffing machine, a buffing roll, a table having a slot and adapted to support a piece of work, a member movable along and through the slot in the table for extending portions of the work and carrying the work into contact with the buffing roll, said member being bodily movable between work receiving and work presenting positions, and means for driving the member to feed the work past the buffing roll.

10. In a buffing machine, a buffing roll, a table for supporting a piece of work, a member movable along a slot in the table for supporting portions of the work and presenting them to the buffing roll, said member being bodily movable between work receiving and work presenting positions, and means for moving the member to work presenting position.

11. In a buffing machine, a buffing roll, a table having a slot and adapted to support a piece of work, a member movable along and through the slot in the table for supporting portions of the work and presenting them in extended condition to the buffing roll, said member being bodily movable between work receiving and work presenting positions, means for driving the member to feed the work past the buffing roll and a manually operable lever for moving the member to work presenting position.

12. In a buffing machine, a buffing roll, a table for supporting a piece of work, an endless band movable through a slot in the table for feeding portions of the work into contact with the buffing roll, said band being bodily movable along the said slot between work receiving and work presenting positions, and means for driving the band positively to feed the work at a uniform rate past the buffing roll.

13. In a buffing machine having a frame for supporting machine parts, a buffing roll, means for rotating the roll, a work-supporting member movable between work receiving and work presenting positions with respect to the buffing roll, a yoke for pivotally supporting the member, power means comprising an endless chain for causing positive feeding movement of the member, and a shaft journaled in the frame and having a sprocket wheel for driving the chain, said yoke having a pivot located above said shaft in such relation thereto that driving of the chain is not affected by movement of the yoke.

14. In a buffing machine, a buffing roll, means for rotating the roll, a work-supporting endless band movable between work receiving and work presenting positions with respect to the buffing roll, rollers for supporting the band and for keeping it under proper tension, a yoke for pivotally supporting the band and rollers, power means comprising an endless chain for driving one of the rollers thus causing feeding movement of the endless band, and a shaft stationary in the frame and having a sprocket wheel for driving the chain, said yoke having a pivot located above said shaft in such relation thereto that driving of the chain is not affected by movement of the yoke.

15. In a buffing machine, a rotary buffing roll, an endless band for supporting the work and presenting it to the buffing roll, a pair of rollers for supporting the band and for maintaining it under proper tension, a yoke for supporting the band and rollers, said yoke being pivoted for movement with respect to the buffing roll, means for driving the band at a predetermined rate of speed, and means for moving the yoke to effect the work receiving and work presenting movements of the band.

16. In a buffing machine, a rotary buffing roll, an endless band for supporting the work and presenting it to the buffing roll, a pair of rollers for supporting the band and for maintaining it under proper tension, a yoke for supporting the band and rollers, said yoke being pivoted to the frame of the machine to permit movement of the yoke whereby the band may be moved between work receiving and work presenting positions, means for driving the band positively at a predetermined rate of speed, and a member under the control of the operator for moving the yoke to effect the work receiving and work presenting movements of the band.

17. In a machine for treating leather and other similar pieces of work, a rotary work treating tool, a member for supporting portions of a piece of work and presenting them to the tool, means for causing feeding movement of the member, a table for supporting the work and having a slot therein in which the member operates and along which it is bodily movable between work receiving and work presenting positions, and means for effecting the described bodily movements of the work supporting and presenting member.

18. In a machine for treating leather and other similar pieces of work, a rotary work treating tool, an endless band for supporting portions of a piece of work and presenting them to the tool, rollers for supporting the band and for maintaining it under proper tension, a table for supporting and guiding the work and having a slot therein in which the endless band operates and in which it is bodily movable between work receiving and work presenting positions, and means under the control of the operator for effecting the described bodily movements of the work supporting band.

19. In a machine for treating leather and other similar pieces of work, a rotary work treating tool, a table for supporting a piece of work and having a slotted portion, a member for supporting a portion of the piece of work and presenting it to the action of the tool, and means for moving the member along the slot in the table in a direction toward the tool to extend the portion of the work to be immediately operated upon thereby effacing any folds or wrinkles therein whereby all portions of the surface of the work are uniformly presented to the operation of the tool.

20. In a machine for treating leather and other similar pieces of work, a rotary work treating tool, a table for supporting a piece of work and having a slotted portion, a member for supporting a portion of the piece of work and presenting it to the action of the tool, power means for causing feeding movement of the member, and means for moving the member along the slot in the table between work receiving and work presenting positions with respect to the treating tool, the arrangement being such that movement of the power driven feeding member bodily toward the treating tool causes the work to be stretched out for the operation of the tool in such a way that folds and wrinkles therein are effaced before the tool begins to operate.

In testimony whereof I have signed my name to this specification.

GUSTAV ADOLF SCHETTLER.